Patented July 21, 1953

2,646,385

UNITED STATES PATENT OFFICE 2,646,385

PHARMACEUTICAL PRODUCT FOR DYSMENORRHEA

Mozes J. Lewenstein, Richmond Hill, N. Y.

No Drawing. Application June 1, 1951,
Serial No. 229,538

9 Claims. (Cl. 167—55)

This invention relates to a composition for relieving pain and it has particular relation to a new and improved composition for the treatment of painful sensations caused by "essential" or "primary" dysmenorrhea, as distinguished from forms of menstrual pain or discomfort due to pelvic disease.

The main object of this invention is to provide a composition which has a specific effect in relieving pain occurring in essential or primary dysmenorrhea.

Another object of my invention is to provide a composition of the before mentioned type, which has reduced or no undesirable side effects and remains effective in continuous use.

It is also an object of my invention to provide a composition of the above mentioned type, which can be administered to patients during a protracted period of time without the danger of addiction.

Further objects and the advantages of my invention will be apparent from the appended claims and the following specification which describes some embodiments of my invention.

It has been known that a very considerable number of women suffer from disturbances, ranging from slight discomfort to incapacitating pains, due to dysmenorrhea. The etiology of dysmenorrhea has not been sufficiently established up to date and the compositions hitherto suggested for its treatment have not been completely satisfactory. Such compositions, which usually contain ingredients belonging to the class of antispasmodics, and/or antineuralgics, hypnotics and emmenagogues, have shown various disadvantages. They either contain components which have substantial undesirable side effects and/or may be habit forming drugs, or their efficiency decreases when administered to a patient for an extended period of time.

I have now found that an efficient composition, which is substantially free from the above mentioned disadvantages, can be obtained from the following ingredients:

(a) A mixture of a major amount of a simple salt of dihydrohydroxycodeinone and a minor amount of a double salt of dihydrohydroxycodeinone and homatropine;

(b) Acetophenetidin and/or (c) acetylsalicylic acid; and (d) Alpha-mono-brom-iso-valerianyl-urea.

I prefer to use the above components with the addition of caffeine.

I have found that an extremely favorable synergistic effect on disturbances due to dysmenorrhea is obtained by using the above ingredients in the following proportions:

| | Parts by weight |
|---|---|
| (a) dihydrohydroxycodeinone hydrochloride | 2 to 10 |
| dihydrohydroxycodeinone homatropine terephthalate | 0.25 to 1.50 |
| (b) Acetophenetidin | 80 to 350 |
| (c) Acetylsalicylic acid | 100 to 600 |
| (d) alpha-mono-brom-iso-valerianyl-urea | 150 to 1000 |
| (e) Caffeine | 16 to 100 |

The presence of the ingredients (a); (b) and/or (c); and (d) in the above mentioned proportions is critical in obtaining the desired synergistic as well as the desired pain relieving effect.

It has been found that by using, instead of a conventional salt, such as, dihydrohydroxycodeinone hydrochloride by itself, a mixture of the above mentioned type, i. e., a mixture consisting of a major amount of the conventional salt with a minor amount of the double salt of dihydrohydroxycodeinone and homatropine, all undesirable effects occurring in the use of said conventional salts, are considerably reduced or eliminated. Furthermore, it has been found that said mixture of the hydrochloride and terephthalate double salt coacts with acetophenetidin, and/or acetylsalicylic acid and alpha-monobrom-iso-valerianyl-urea and a favorable synergistic effect in the treatment of dysmenorrhea, which could not be expected on the basis of the known properties of the individual ingredients used according to the present invention, is obtained.

The following examples describe some embodiments of the invention, to which the invention is not limited. The parts mentioned are parts by weight, unless otherwise stated.

*Example 1*

A homogeneous mixture is prepared from the following ingredients:

4.50 parts of dihydrohydroxycodeinone hydrochloride;
0.756 part of dihydrohydroxycodeinone homatropine terephthalate;
160.00 parts of acetophenetidin;
32.00 parts of caffeine;
224.00 parts of acetylsalicylic acid, and
300.00 parts of alpha-mono-brom-iso-valerianyl-urea

Example 2

4.50 parts of dihydrohydroxycodeinone hydrochloride;
0.756 part of dihydrohydroxycodeinone homatropine terephthalate;
160.00 parts of acetophenetidin;
224.00 parts of acetylsalicylic acid, and
300.00 parts of alpha-mono-brom-iso-valerianyl-urea are mixed to form a uniform, homogeneous product.

Example 3

3 parts of dihydrohydroxycodeinone hydrochloride;
1 part of dihydrohydroxycodeinone homatropine terephthalate;
200 parts of acetophenetidin;
16 parts of caffeine;
400 parts of acetylsalicylic acid, and
300 parts of alpha-mono-brom-iso-valerianyl-urea are mixed to a homogeneous product.

Example 4

9 parts of dihydrohydroxycodeinone hydrochloride;
0.9 part of dihydrohydroxycodeinone homatropine terephthalate;
100 parts of acetophenetidin;
20 parts of caffeine;
300 parts of acetylsalicylic acid, and
300 parts of alpha-mono-brom-iso-valerianyl-urea are mixed to a homogeneous product.

Example 5

4. parts of dihydrohydroxycodeinone hydrochloride
0.5 part of dihydrohydroxycodeinone homatropine terephthalate
500 parts of acetylsalicylic acid
500 parts of alpha-mono-brom-iso-valerianyl-urea

Example 6

6 parts of dihydrohydroxycodeinone hydrochloride
0.7 part of dihydrohydroxycodeinone homatropine terephthalate
24 parts of caffeine
450 parts of acetylsalicylic acid
350 parts of alpha-mono-brom-iso-valerianyl-urea

Example 7

7 parts of dihydrohydroxycodeinone hydrochloride
0.7 part of dihydrohydroxycodeinone homatropine terephthalate
250 parts of acetophenetidin
450 pars of alpha-mono-brom-iso-valerianyl-urea

Example 8

2.50 parts of dihydrohydroxycodeinone hydrochloride
0.3 part of dihydrohydroxycodeinone homatropine terephthalate
175 parts of acetophenetidin
50 parts of caffeine
600 parts of alpha-mono-brom-iso-valerianyl-urea The products obtained according to any of the above Examples 1–8 can be formed to tablets in the conventional manner. For example, 100 parts of a mixture prepared according to one of the above examples, is mixed with the following ingredients:

0.40 part of certified color
26.40 parts of starch
1.22 parts of zinc stearate

The mixture thus obtained is formed in conventional manner to tablets containing the desired amount of active ingredients.

It will be understood that the present invention is not limited to the specific details described above and can be carried out with various modifications without departing from the scope of the invention as defined by the appended claims. For example, instead of the preferred dihydrohydroxycodeinone hydrochloride, similar simple salts, with other suitable acids, of this base, and instead of the likewise preferred dihydrohydroxycodeinone homatropine terephthalate, analogous double salts formed with other suitable acids, such as malonic acid, fumaric acid, adipic acid, tartaric acid, succinic acid, citric acid, phthalic acid and the like can be used. The terms "simple salt of dihydrohydroxycodeinone" and "double salt of dihydrohydroxycodeinone and homatropine" are used in the present application to include simple salts and double salts of the beforementioned composition.

Reference is made to my co-pending patent application Serial Number 85,050 filed on April 1, 1949, in which, among others, certain mixtures of simple salts of dihydrohydroxycodeinone with double salts formed from dihydrohydroxycodeinone and homatropine are described and claimed.

The dihydrohydroxycodeinone homatropine terephthalate and the beforementioned analogous double salts can be prepared in the manner disclosed in my beforementioned co-pending application Serial Number 85,050, filed on April 1, 1949, now Patent No. 2,628,185, issued February 10, 1953.

It is to be understood that in the appended claims the terms "a simple salt of dihydrohydroxycodeinone with a non-toxic acid used in an amount equivalent to 2 to 10 parts of dihydrohydroxycodeinone hydrochloride" and "a double salt of dihydrohydroxycodeinone and homatropine with a non-toxic acid used in an amount equivalent to 0.25 part to 1.50 parts of dihydrohydroxycodeinone homatropine terephthalate," denote an amount of said simple salt or of said double salt, respectively in which the same amount of dihydrohydroxycodeinone—as well as the same amount of homatropine in the case of the double salt—is present in chemically combined form as in 2 to 10 parts of dihydrohydroxycodeinone hydrochloride and in 0.25 part to 1.50 parts of dihydrohydroxycodeinone homatropine terephthalate, respectively.

What is claimed is:

1. As a new pharamaceutical product, a composition comprising the following active ingredients: a simple salt of dihydrohydroxycodeinone with a non-toxic acid, used in an amount equivalent to 2 to 10 parts of dihydrohydroxycodeinone hydrochloride; a double salt of dihydrohydroxycodeinone and homatropine with a non-toxic acid, used in an amount equivalent to 0.25 part to 1.50 parts of dihydrohydroxycodeinone homatropine terephthalate; at least one substance selected from the group of acetophenetidine and acetylsalicylic acid, the acetophenetidine being used in an amount of 80 to 350 parts and the acetylsalicylic acid being used in an amount of 100 to 600 parts; and 150 to 1000 parts of alpha-mono-brom-iso-valerianyl-urea.

2. As a new pharmaceutical product, a composition comprising the following active ingredients: 2 to 10 parts of dihydrohydroxycodeinone hydrochloride; 0.25 part to 1.50 parts of dihydrohydroxycodeinone homatropine terephthalate; 80 to 350 parts of acetophenetidine; 100 to 600 parts of acetylsalicylic acid; 150 to 1000 parts of alpha-mono-brom-iso-valerianyl-urea.

3. As a new pharamaceutical product, a composition comprising the following active ingredients: 2 to 10 parts of dihydrohydroxycodeinone hydrochloride; 0.25 part to 1.50 parts of dihydrohydroxycodeinone homatropine terephthalate; 80 to 350 parts of acetophenetidine; 100 to 600 parts of acetylsalicylic acid; 150 to 1000 parts of alpha-mono-brom-iso-valerianyl-urea; 16 to 100 parts of caffeine.

4. As a new pharmaceutical product, a composition comprising the following active ingredients: about 4.50 parts of dihydrohydroxycodeinone hydrochloride; about 0.756 part of dihydrohydroxycodeinone homatropine terephthalate; about 160 parts of acetophenetidin; about 224 parts of acetylsalicylic acid; about 300.00 parts of alpha-mono-brom-iso-valerianyl-urea.

5. As a new pharmaceutical product, a composition comprising the following active ingredients: about 4.50 parts of dihydrohydroxycodeinone hydrochloride; about 0.756 part of dihydrohydroxycodeinone homatropine terephthalate; about 160 parts of acetophenetidin; about 224 parts of acetylsalicylic acid; about 300.00 parts of alpha-mono-brom-iso-valerianyl-urea; 32.00 parts of caffeine.

6. As a new pharmaceutical product, a composition comprising the following active ingredients: about 4 parts of dihydrohydroxycodeinone hydrochloride; about 0.5 part of dihydrohydroxycodeinone homatropine terephthalate; about 500 parts of acetylsalicylic acid; about 500 parts of alpha-mono-brom-iso-valerianyl-urea.

7. As a new pharmaceutical product, a composition comprising the following active ingredients: about 6 parts of dihydrohydroxycodeinone hydrochloride; about 0.7 part of dihydrohydroxycodeinone homatropine terephthalate; about 24 parts of caffeine; about 450 parts of acetylsalicylic acid; about 350 parts of alpha-mono-brom-iso-valerianyl-urea.

8. As a new pharmaceutical product, a composition comprising the following active ingredients: about 7 parts of dihydrohydroxycodeinone hydrochloride; about 0.7 part of dihydrohydroxycodeinone homatropine terephthalate; about 250 parts of acetophenetidin; about 450 parts of alpha-mono-brom-iso-valerianyl-urea.

9. As a new pharmaceutical product, a composition comprising the following active ingredients: about 2.50 parts of dihydrohydroxycodeinone hydrochloride; about 0.3 part of dihydrohydroxycodeinone homatropine terephthalate; about 175 parts acetophenetidin; about 50 parts of caffeine; about 600 parts of alpha-mono-brom-iso-valerianyl-urea.

MOZES J. LEWENSTEIN.

References Cited in the file of this patent

UNITED STATES PATENTS

| Number | Name | Date |
| --- | --- | --- |
| 1,061,139 | Straub | May 6, 1913 |

OTHER REFERENCES

Extra Pharmacopoeia, volume 1, 22nd edition (1941), pages 444, 1007, and 1008.

Drug and Cosmetic Industry, August 1950, volume 67, pages 275 to 276.